XR 3,400,341
CROSS REFERENCE
225
X 89302

Sept. 3, 1968 E. K. SITTIG 3,400,341

ELASTIC DISPERSIVE DELAY LINE

Filed March 8, 1966 2 Sheets-Sheet 1

INVENTOR
E. K. SITTIG
BY
Sylvan Sherman
ATTORNEY

3400341
OR IN 333/30R

ELASTIC DISPERSIVE DELAY LINE

Filed March 8, 1966 2 Sheets-Sheet 2

3,400,341
ELASTIC DISPERSIVE DELAY LINE

Erhard K. Sittig, Berkeley Heights, N.J., assignor to Bell Telephone Laboratories, Incorporated, New York, N.Y., a corporation of New York
Filed Mar. 8, 1966, Ser. No. 532,650
4 Claims. (Cl. 333—30)

This invention relates to reflective-type elastic delay lines whose dispersion characteristics vary monotonically as a function of frequency.

The use of elastic delay lines as a convenient means of producing frequency dispersion in multifrequency transmission systems is well known. For example, frequency dispersive delay lines are used in radar systems to achieve pulse expansion and compression.

Previously described devices use either frequency dependent steering of ultrasonic beams by means of suitable arrays of transducers, or intercept and correlate ultrasonic signals incident upon different parts of frequency selective transducer structures as a means of achieving path length variations as a function of frequency.

In accordance with the present invention, frequency dispersion is produced by utilizing frequency selective reflections in a transmission structure containing a large number of slightly mismatched sections. The mismatches are arranged such that for selected frequencies, the individually small signal components reflected by the discontinuities at different locations along the tranmission structure add approximately in phase. As a result, the total path length and, hence, the total delay for each of the frequency components is individually controlled to produce a dispersion characteristic that varies monotonically as an arbitrary function of frequency.

Various illustrative embodiments are described including single-ended elastic delay lines in which the same transducer both launches and receives the elastic signal, and double-ended embodiments in which separate launching and receiving transducers are used.

Prior art dispersive delay lines using grating structures, such as perpendicular diffraction delay lines or double array surface wave lines, require large surface area transducers or gratings. The resulting large capacitance associated with the large structures leads to serious termination problems as the signal frequency is increased. It is an advantage of the present invention that the transducers are substantially reduced in size and, hence, their capacitance is correspondingly less. In addition, the absence of multiple diffraction orders, which contribute to the total insertion loss; the compactness of structure; and the greater ease of fabrication represent some of the other advantages of the present invention.

Figure 1:
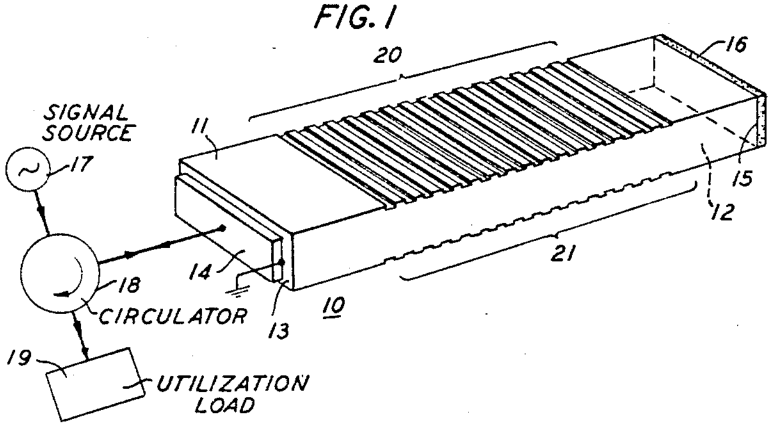
Figure 2:
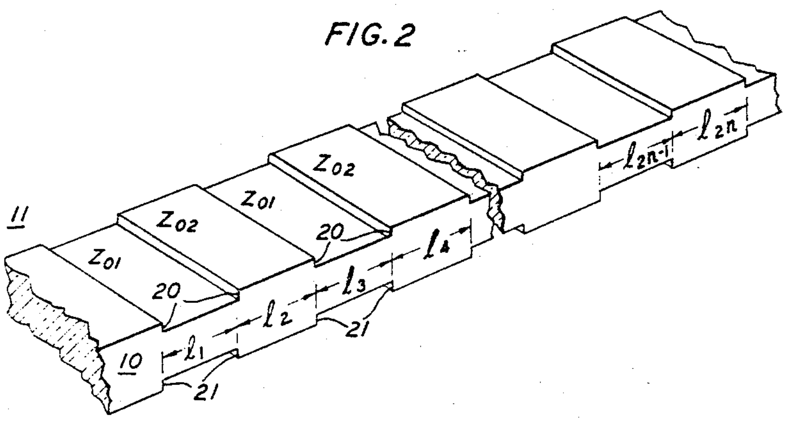
Figure 3:
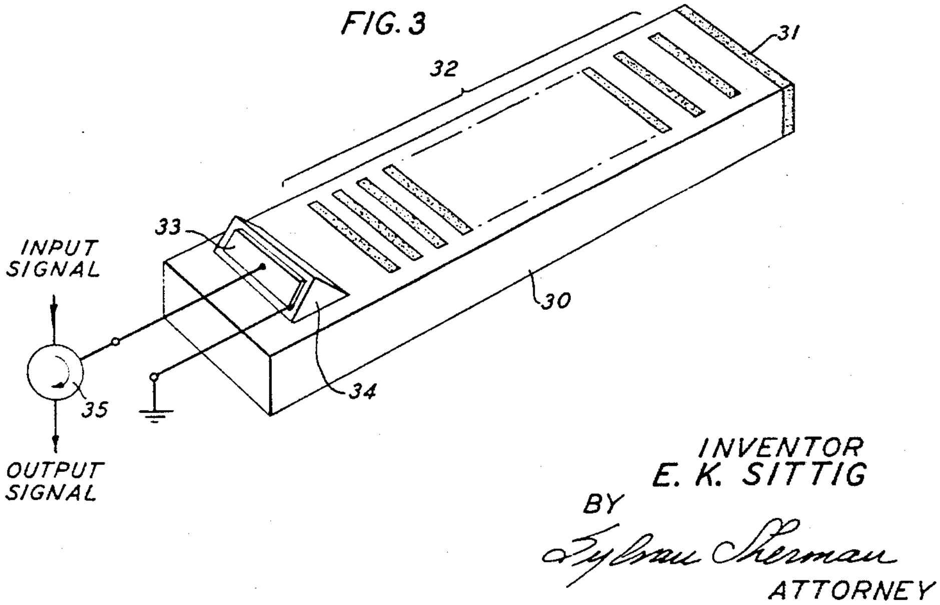
Figure 4:
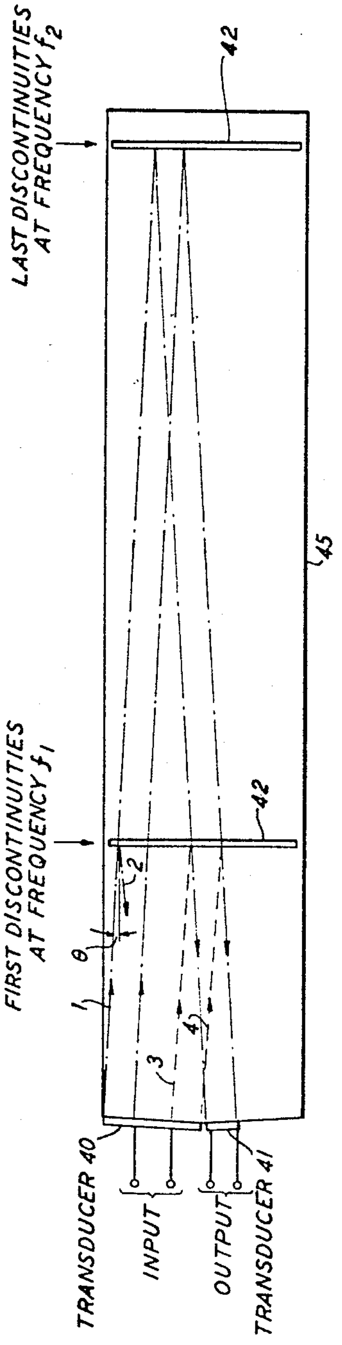
Figure 5:
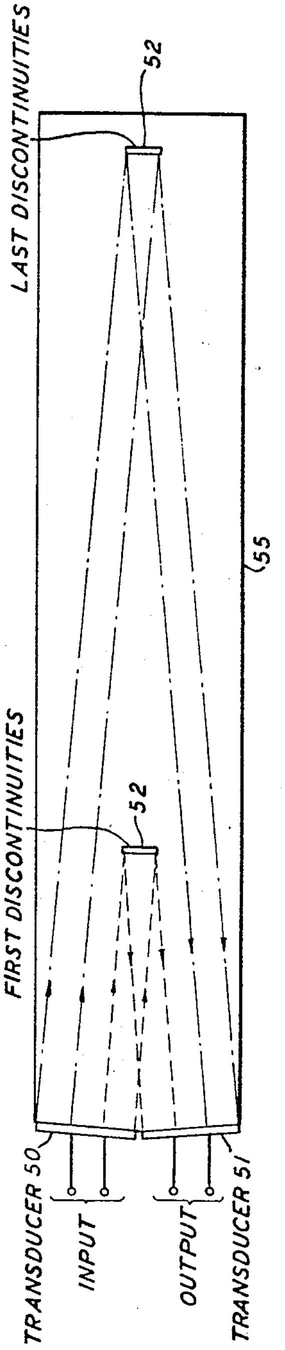

These and other objects and advantages, the nature of the present invention, and its various features, will appear more fully upon consideration of the various illustrative embodiments now to be described in detail in connection with the accompanying drawings, in which:

FIG. 1 shows a first illustrative embodiment of the invention using a single transducer;

FIG. 2, included for purposes of explanation, is an enlargement of a portion of the embodiment of FIG 1 showing the reflective discontinuities;

FIG. 3 is a second illustrative embodiment of the invention using a single transducer; and FIGS. 4 and 5 show two embodiments of a delay line, in accordance with the invention, using separate launching and receiving transducers.

Referring to the drawings, FIG. 1 shows a first embodiment of a delay line, in accordance with the invention, comprising a rectangular cross-sectioned bar 10 of elastic wave propagating material. For purposes of illustration, bar 10 can be formed of an isotropic material such as glass or vitreous silica, or of a metal alloy having a grain size that is small compared to the wavelength of the elastic wave to be propagated therealong. The top and bottom surfaces 11 and 12, respectively, are parallel, and spaced apart a mean distance that depends upon the mode of propagation of the elastic wave. For example, if a transverse (shear) mode is used, the spacing can be somewhat larger than half a wavelength. For the longitudinal mode, the spacing is preferably less than half a wavelength.

Means 14 are provided at one end 13 of bar 10 for launching therealong a multifrequency elastic wave. For this purpose any of the many known conventional transducers can be used. The opposite end 15 of bar 10 is provided with an acoustic wave absorber 16 of known type for absorbing and dissipating any elastic wave energy that reaches it. Because the embodiment of FIG. 1 is "singled-ended," in that the elastic wave is both launched and received by the same transducer 14, the multifrequency electromagnetic driving signal, derived from a signal source 17, may be applied to transducer 14 through a circulator 18. In this manner, the output electromagnetic signal is separated from the signal source, by way of circulator 18, and applied to an output utilization load 19.

In the absence of any special arrangements to the contrary, an elastic signal, launched at end 13 of bar 10, would propagate along the bar and would simply be absorbed upon reaching the opposite end 15. In accordance with the present invention, however, means are provided at different locations along bar 10 for selectively reflecting back towards end 13 portions of the incident elastic wave. In particular, reactive discontinuities are arranged along bar 10 so as to reflect signal components for different frequencies at different locations. In this way the round trip transmission time for the different frequencies making up the signal can be controlled and the delay characteristic of the delay line varied as a function of frequency.

For purposes of illustration, discontinuities along the line are produced by abruptly varying the transverse distance between surfaces 11 and 12 by either machining, etching or plating the respective surfaces. These discontinuities are represented in FIG. 1 by the transverse markings 20 and 21 along the upper and lower surfaces 11 and 12, respectively, of bar 10.

FIG. 2, included for purposes of explanation, is an enlargement of a portion of bar 10 showing the discontinuities 20 and 21 in greater detail. Such a transmission line can be considered as made up of alternate sections of transmission line of lengths $l_1$, $l_2$, $l_3$, et cetera, and of characteristic impedances $Z_{01}$ and $Z_{02}$. For purposes of the following discussion, the lengths of delay line having the characteristic impedance $Z_{01}$ are designated by the odd-numbered subscript $l_1, l_3, \ldots l_{2n-1}$, whereas the lengths of line having the characteristic impedance $Z_{02}$ are designated by the even-numbered subscript $l_2, l_4, \ldots, l_{2n}$.

The results of a mathematical analysis of this line configuration discloses that maximum total reflection of signal of wavelength λ is obtained when the phase delay between adjacent discontinuities is a quarter of that wavelength, or an odd integral multiple thereof, and that the maximum reflection factor attainable increases monotonically with the number of contributing sections and the mismatch factor $$Z=\left|\frac{Z_{02}}{Z_{01}}-1\right|$$

between sections. Of course, the reflection factor cannot exceed unity.

It is apparent that energy is also reflected by the discontinuities at frequencies for which the phase delay between discontinuities is not equal to λ/4. To obtain increased discrimination between wanted and unwanted signals, large numbers of discontinuities are advantageously used with as small a mismatch Z as is compatible with other design parameters. Typically, the change in height at each discontinuity is such as to produce a mismatch of about two percent.

The sum of the signal components reflected by the discontinuities is a maximum at a particular frequency when the discontinuities are spaced apart a quarter of a wavelength at that frequency. However, in order to obtain the desired frequency dispersion characteristic the spacing between discontinuities must be different at different locations along the delay line. These requirements could be satisfied by having discrete intervals of uniformly spaced discontinuities which vary from location to location along the delay line. However, the preferred practice is to obtain the desired dispersion characteristic by continuously varying the spacing between adjacent discontinuities so that, in fact, no two spacings are exactly equal. When this is done, the reflection obtained over any particular interval along the line is over a band of frequencies rather than at a discrete frequency. The manner in which the dispersion characteristic varies as a function of frequency is dependent upon the manner in which the distance between discontinuities is made to vary.

There is an additional practical consideration which will influence the design of the delay line. In the discussion above, it was indicated that the spacing between adjacent discontinuities $l_1, l_2, l_3, l_4, \ldots l_{2n}$, continuously vary. However, there is an alternate arrangement that can be used which depends upon the method of construction employed. In this second arrangement, either $l_1, l_3, \ldots l_{2n-1}$ or $l_2, l_4, \ldots l_{2n}$ may more conveniently be made a constant over the entire length of the line, and the desired frequency characteristic obtained by varying the other lengths such that the total phase shift over pairs of adjacent lengths, such as $l_1+l_2$, $l_3+l_4$, . . . and $l_{2n-1}+l_{2n}$, is equal to half a wavelength at the frequency of interest. For example, if the discontinuities are to be formed by machining, it may be more convenient to make cuts of constant width, in which case lengths $l_1, l_3, \ldots l_{2n-1}$ are equal. To obtain the desired dispersion curve, only the distance $l_2, l_4, \ldots l_{2n}$ are then varied such that the phase shift over pairs of adjacent lengths of line is λ/2.

FIG. 3 shows a second embodiment of the invention, useful at higher frequencies. It is similar to the embodiment of FIG. 1 in that it comprises an elongated bar 30 of elastic wave propagating material, terminated at one end by means of an elastic wave absorber 31, and including an arrangement of impedance discontinuities 32 distributed along its length. In the instant embodiment, however, a Rayleigh wave is launched along the bar by means of a shear wave transducer 33 mounted on a mode converter wedge 34. (For a more detailed discussion of Rayleigh wave transducers, see United States Patent 3,289,114, issued to J. H. Rowen on Nov. 29, 1966. Because the structure of FIG. 3 is single-ended, a circulator 35 is advantageously used to decouple the input and output circuits.

Aside from the difference in the elastic mode employed, the embodiment of FIG. 3 operates in the manner described above in connection with the embodiment of FIG. 1.

FIGS. 4 and 5 are illustrative of double-ended delay lines in which separate transducers are used to launch and receive the elastic signal. In both embodiments the transducers 40 and 41, and 50 and 51 are arranged at a small angle to each other, at one end of bars 45 and 55, respectively, and at an angle to the direction of the discontinuities 42 in FIG. 4 and 52 in FIG. 5. As a result of this arrangement, the distance between adjacent discontinuities is slightly less than was used in the single-ended embodiment of FIGS. 1 and 3. In particular, if the angle of incidence of the elastic wave is $\theta$, the design distance between adjacent discontinuities is given by λ/4 cos $\theta$ or the design distance between alternate discontinuities is given by λ/2 cos $\theta$.

In addition to the different spacing requirements, it will be noted that the reflected energy is displaced laterally and that the amount of displacement varies as a function of frequency since the reflections occur at different locations along the delay line. As a result, not all of the incident energy can be extracted from the elastic medium. This is illustrated in FIG. 4 wherein energy at frequency $f_1$, incident along path 1 and reflected along path 2 by the first discontinuities, cannot reach the output transducer 41. In fact, only that portion of the wave energy at frequency $f_1$ between paths 3 and 4 would, upon reflection, be intercepted by the output transducer 41. By contrast, all of the incident wave energy at frequency $f_2$ reflected by the last discontinuities would be in a position to reach output transducer 41 assuming it is as big as the input transducer 40. This, however, would result in a nonuniform amplitude response as a function of frequency. This can be avoided, and a more uniform response obtained at the cost of some additional loss, by making the width of one of the transducers narrower than the other. In FIG. 4, the output transducer 41 is made narrower, but it is understood that as the device is completely reciprocal, the same result can also be achieved by making the input transducer narrower than the output transducer.

Alternatively, the same result can be achieved by making the transducers the same width, but reducing the width of the discontinuities relative to the total width of bar 55, as illustrated in FIG. 5. In both of the above-described arrangements the object is to have equal amounts of energy transmitted between the input and output transducers at all frequencies. The size of the transducers and the discontinuities relative to the width of the elastic medium to achieve this result is a problem in geometry and depends upon the angle of incidence and the length of the delay line.

In all cases it is understood that the above-described arrangements are illustrative of a small number of the many possible specific embodiments which can represent applications of the principles of the invention. Thus, numerous and varied other arrangements can readily be devised in accordance with these principles by those skilled in the art without departing from the spirit and scope of the invention.

What is claimed is:

1. A dispersive, elastic wave delay line comprising:
an elastic wave propagation medium;
means located at one end of said medium for launching an elastic wave therein in a given direction and for extracting therefrom reflected wave energy;
and reactive discontinuities disposed along said medium in said given direction for reflecting portions of said wave energy towards said one end;

said discontinuities arranged to reflect signal components at different frequencies from different locations along said medium.

2. The delay line according to claim 1 wherein the distance between adjacent discontinuities varies monotonically along the length of said line;

3. The delay line according to claim 1 wherein said means for launching and for extracting said elastic wave comprises a single transducer.

4. The delay line according to claim 1 wherein said means for launching and for extracting said elastic wave comprises two separate transducers.

References Cited

UNITED STATES PATENTS

| | | | |
|---|---|---|---|
| 3,264,583 | 8/1966 | Fitch | 333—30 |
| 3,277,404 | 10/1966 | Fabian | 333—30 |

ROY LAKE, *Primary Examiner.*

D. R. HOSTETTER, *Assistant Examiner.*